United States Patent
Shu et al.

(10) Patent No.: US 11,527,088 B2
(45) Date of Patent: Dec. 13, 2022

(54) DOCUMENT TEMPLATE DETECTION WITH OPTICAL CHARACTER RECOGNITION

(71) Applicant: SAP SE, Walldorf (DE)

(72) Inventors: Zhen Shu, Singapore (SG); Piyush Dane, Singapore (SG); Kaiqing Liu, Singapore (SG)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 17/209,425

(22) Filed: Mar. 23, 2021

(65) Prior Publication Data
US 2022/0309277 A1 Sep. 29, 2022

(51) Int. Cl.
*G06V 30/418* (2022.01)
*G06K 9/62* (2022.01)
(Continued)

(52) U.S. Cl.
CPC ......... *G06V 30/418* (2022.01); *G06K 9/6215* (2013.01); *G06T 7/70* (2017.01);
(Continued)

(58) Field of Classification Search
CPC .... G06V 30/418; G06V 10/751; G06V 30/10; G06T 7/70; G06T 2207/30176; G06K 9/6215
See application file for complete search history.

(56) References Cited

U.S. PATENT DOCUMENTS

| 8,724,907 B1 | 5/2014 | Sampson et al. |
| 8,843,494 B1 | 9/2014 | Sampson |

(Continued)

FOREIGN PATENT DOCUMENTS

CN 112085885 A * 12/2020

OTHER PUBLICATIONS

Dhakal et al., "One-Shot Template Matching for Automatic Document Data Capture." arXiv preprint arXiv:1910.10037, Oct. 2019, 5 pages.
(Continued)

*Primary Examiner* — Shaghayegh Azima
(74) *Attorney, Agent, or Firm* — Fish & Richardson P.C.

(57) ABSTRACT

Implementations include receiving a first intermediate document representation of a first document, the first intermediate document representation including OCR data of document text and positions of document text in the first document, receiving a set of intermediate template representations for a set of templates, the set of intermediate template representations including, for each template in the set of templates, OCR data representative of template text and positions of template text in a respective template, determining a first sub-set of templates using text-based detection based on the first intermediate document representation and the set of intermediate template representations, determining a second sub-set of templates using position-based detection based on the first intermediate document representations and intermediate template representations associated with one or more templates in the first sub-set of templates, and transmitting instructions to execute template-based data extraction for the first document using a template of the second sub-set of templates.

17 Claims, 4 Drawing Sheets

(51) Int. Cl.
  *G06T 7/70* (2017.01)
  *G06V 10/75* (2022.01)
  *G06V 30/10* (2022.01)

(52) U.S. Cl.
  CPC .. *G06V 10/751* (2022.01); *G06T 2207/30176* (2013.01); *G06V 30/10* (2022.01)

(56) References Cited

U.S. PATENT DOCUMENTS

| | | | |
|---|---|---|---|
| 2018/0365248 A1 | 12/2018 | Zheng | |
| 2019/0286691 A1* | 9/2019 | Sodhani | G06N 3/0445 |
| 2019/0392929 A1* | 12/2019 | Gassman | G16H 10/60 |
| 2020/0065576 A1 | 2/2020 | Padmanaban et al. | |
| 2020/0074169 A1* | 3/2020 | Mukhopadhyay | G06Q 50/18 |
| 2021/0064860 A1* | 3/2021 | Tuma | G06K 9/6227 |
| 2021/0158038 A1* | 5/2021 | Shanmuganathan | G06V 30/1478 |

OTHER PUBLICATIONS

Towardsdatascience.com [online], "The Best Document Similarity Algorithm in 2020: A Beginner's Guide" Aug. 2020, [retrieved on Feb. 25, 2021], retrieved from: URL <https://towardsdatascience.com/the-best-document-similarity-algorithm-in-2020-a-beginners-guide-a01b9ef8cf05>, 17 pages.

Tron et al., "Fast multi-image matching via density-based clustering." Proceedings of the IEEE international conference on computer vision, 2017, 10 pages.

Tsai et al., "Visual text features for image matching." 2012 IEEE International Symposium on Multimedia. IEEE, Dec. 2012, 5 pages.

Tzacheva et al., "Document image matching using a maximal grid approach." Document Recognition and Retrieval IX. vol. 4670. International Society for Optics and Photonics, 2001, 8 pages.

Extended European Search Report issued in European Appln. No. 22160466.3, dated Jul. 21, 2022, 11 pages.

* cited by examiner

DOCUMENT TEMPLATE DETECTION WITH OPTICAL CHARACTER RECOGNITION

BACKGROUND

Enterprises use software systems in order to conduct their operations. Example operations can include, without limitation, accounting, record keeping, ordering, data analysis, and the like. In some examples, users can interact with a software system to perform tasks manually, while other tasks are performed automatically by the software system. In the context of accounting operations, incoming payments can be considered. For example, each time an enterprise engages with a customer, an invoice is generated and is provided to the customer for remittance. The invoice can be provided as a computer-readable document, such as a portable document format (PDF) document. In the context of accounting operations, other example documents can include, without limitation, payment advices and purchase orders.

In order to conduct operations, documents need to be processed to extract data and use the data for subsequent tasks (e.g., clearing invoices). To process documents, automated systems have been developed. For example, machine automation (e.g., computer-automated document processing) is a favorable option for document processing with multiple benefits—higher efficiency, better repeatability, and increased reliability (e.g., as compared to manual data entry). However, data needs to be extracted from received documents in order for machine automation to execute operations based on the data.

SUMMARY

Implementations of the present disclosure are directed to associating documents with templates for extracting data from the documents. More particularly, implementations of the present disclosure are directed to a template detection system that uses optical character recognition (OCR) to determine whether a document can be associated with a template in a set of templates.

In some implementations, actions include receiving a first intermediate document representation of a first document, the first intermediate document representation including OCR data representative of document text and positions of document text in the first document, receiving a set of intermediate template representations for a set of templates, the set of intermediate template representations including, for each template in the set of templates, OCR data representative of template text and positions of template text in a respective template, determining a first sub-set of templates using text-based detection based on the first intermediate document representation and the set of intermediate template representations, determining a second sub-set of templates using position-based detection based on the first intermediate document representations and intermediate template representations associated with one or more templates in the first sub-set of templates, and transmitting instructions to execute template-based data extraction for the first document using a template of the second sub-set of templates. Other implementations of this aspect include corresponding systems, apparatus, and computer programs, configured to perform the actions of the methods, encoded on computer storage devices.

These and other implementations can each optionally include one or more of the following features: determining a first sub-set of templates using text-based detection at least partially includes providing a document vector representative of the first document based on the document text in the first document, providing template vectors for each template in the set of templates based on template text in respective templates, generating a set of similarity scores by comparing the document vector to respective template vectors, and selectively including one or more templates of the set of templates in the first sub-set of templates based on respective similarity scores of the set of similarity scores; the document vector and the template vectors are each provided as term frequency-inverse document frequency (TF-IDF) text embeddings; determining a second sub-set of templates using position-based detection at least partially includes, for each first document and template pair of templates in the first sub-set of templates, determining a set of matching text between text of the first document and text of a respective template, and generating a spatial similarity score by comparing positions of matching text of the set of matching text, and selectively including one or more templates of the first sub-set of templates in the second sub-set of templates based on respective spatial similarity scores; actions further include receiving a second intermediate document representation of a second document, the second intermediate document representation including OCR data representative of document text and positions of document text in the second document, receiving the set of intermediate template representations for the set of templates, determining a third sub-set of templates using text-based detection based on the second intermediate document representation and the set of intermediate template representations, and determining that the third sub-set of templates is empty and, in response, transmitting instructions to execute template-less data extraction for the second document using a template of the third sub-set of templates; actions further include receiving a second intermediate document representation of a second document, the second intermediate document representation including OCR data representative of document text and positions of document text in the second document, receiving the set of intermediate template representations for the set of templates, determining a third sub-set of templates using text-based detection based on the second intermediate document representation and the set of intermediate template representations, determining a fourth sub-set of templates using position-based detection based on the second intermediate document representations and intermediate template representations associated with one or more templates in the third sub-set of templates, and determining that the fourth sub-set of templates is empty and, in response, transmitting instructions to execute template-less data extraction for the second document; and determining a second sub-set of templates is executed in response to determining that the first sub-set of templates comprises at least one template.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to associating documents with templates for extracting data from the documents. More particularly, implementations of the present disclosure are directed to a template detection system that uses optical character recognition (OCR) to determine whether a document can be associated with a template in a set of templates. Implementations can include actions of receiving a first intermediate document representation of a first document, the first intermediate document representation including OCR data representative of document text and positions of document text in the first document, receiving a set of intermediate template representations for a set of templates, the set of intermediate template representations including, for each template in the set of templates, OCR data representative of template text and positions of template text in a respective template, determining a first sub-set of templates using text-based detection based on the first intermediate document representation and the set of intermediate template representations, determining a second sub-set of templates using position-based detection based on the first intermediate document representations and intermediate template representations associated with one or more templates in the first sub-set of templates, and transmitting instructions to execute template-based data extraction for the first document using a template of the second sub-set of templates.

To provide further context for implementations of the present disclosure, and as introduced above, enterprises use software systems in order to conduct their operations. Example operations can include, without limitation, accounting, record keeping, ordering, data analysis, and the like. In this example context, an example software system includes SAP Cash Application provided by SAP SE of Walldorf, Germany. In some examples, a user can interact with the software system to perform tasks manually, while other tasks are performed automatically by the software system. In the context of accounting operations, incoming payments can be considered. For example, each time an enterprise engages with a customer, an invoice is generated and is provided to the customer for remittance. The invoice can be provided as a computer-readable document, such as a portable document format (PDF) document. In the context of accounting operations, other example documents can include, without limitation, payment advices and purchase orders.

In order to conduct operations, documents need to be processed to extract data and use the data for subsequent tasks (e.g., clearing invoices). To process documents, automated systems have been developed. For example, machine automation (e.g., computer-automated document processing) is a favorable option for document processing with multiple benefits—higher efficiency, better repeatability, and increased reliability (e.g., as compared to manual data entry). However, data needs to be extracted from received documents in order for machine automation to execute operations based on the data.

For machine automation, there are multiple approaches to data extraction. Example approaches include template-based extraction and template-less extraction. Template-based extraction uses a template corresponding to a document to extract information from the document. For example, the template indicates (e.g., using annotated localization information) what information is located where in the document to enable the information (data) to be extracted from the document. Template-less extraction uses machine learning (ML), in which features of target fields in documents are learned in a generic manner from an entire dataset or augmented template data, and a trained ML model is used to extract data. Template-less extraction is popular due to its robustness and high efficiency. However, template-less extraction compromises on quality in view of limited datasets available for training and is highly dependent on document convergence when training a global ML model. Further, template-less extraction implies technical overhead in acquiring and storing datasets for training and computer-executed processes for feature extraction, as well as training, storage, and maintenance of ML models, which burdens technical resources.

In view of the above context, implementations of the present disclosure provide a template detection system that uses OCR to determine whether a document can be associated with a template in a set of templates. As described in further detail herein, the template detection system determines whether a document can be associated with a template using a text-based comparison and a position-based comparison. In some examples, the text-based comparison provides a first sub-set of templates of the set of templates. In some examples, the position-based comparison filters templates from the first sub-set of templates to provide a second sub-set of templates, from which a template can be selected as being associated with the document. The template detection system of the present disclosure is able to categorize an incoming document in real-time as well as to cluster a set of documents into inherent templates. The template detection system of the present disclosure does not require any training process nor any initial template annotation set up. Experimental results show that the template detection system of the present disclosure achieves an accuracy of higher than 95% in matching documents to templates and is considered suitable for adoption as a preceding stage prior to subsequent field matching and merging provided during the data extraction process.

Figure 1:
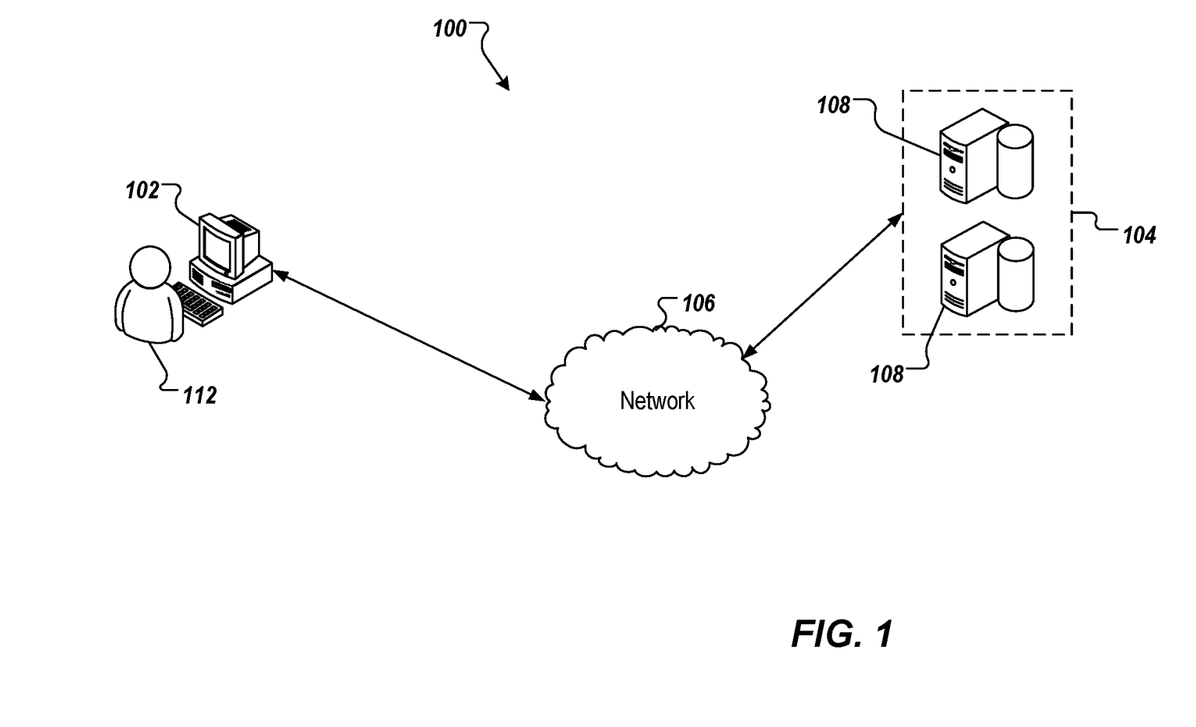
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to, a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a template detection system that processes documents to associate documents with templates. For example, and as described in further detail herein, the template detection system receives a document, processes the document using OCR to provide OCR data, provides an intermediate document representation of the document based on the OCR data, and compares the intermediate document representation to intermediate template representations of respective templates in a set of templates. In some examples, the template detection system associates the document to a template and template-based data extraction is executed to extract data from the document using the template. In some examples, the template detection system determines that the document cannot be associated with any template in the set of templates and template-less data extraction is executed to extract data from the document using the template.

Figure 2:
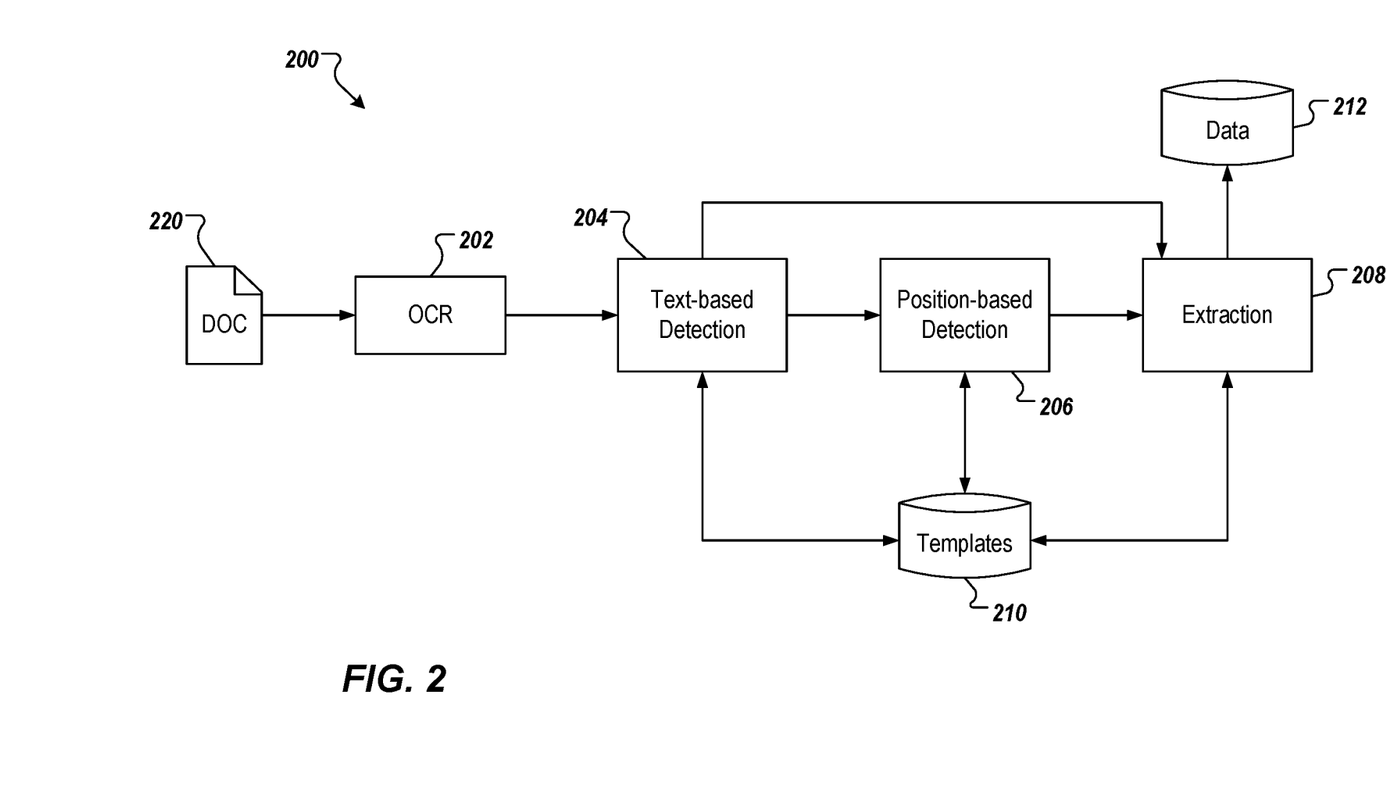
FIG. 2 depicts an example conceptual architecture in accordance with implementations of the present disclosure.

FIG. 2 depicts an example conceptual architecture 200 of a template detection system in accordance with implementations of the present disclosure. In the depicted example, the example conceptual architecture 200 includes an OCR module 202, a text-based detection module 204, a position-based detection module 206, and an extraction module 208. The example conceptual architecture 200 also includes a template store 210 and an extracted data store 212. As described in further herein, a document 220 is processed through the conceptual architecture 200 to determine whether the document can be associated with a template in the set of templates stored within the template store 210. If the document 220 is associated with a template, the extraction module 208 extracts data from the document 220 using the template in a template-based data extraction. If the document 220 is not associated with a template, the extraction module 208 extracts data from the document 220 using a template-less data extraction.

In further detail, the document 220 is received by the template detection system and is processed by the OCR module 202 to generate OCR data. In general, OCR can be described as the electronic conversion of images of typed, handwritten, or printed text into machine-encoded text, which is provided as OCR data. OCR is an established technology and further detail on OCR is foregone.

In some implementations, the text-based detection module 204 receives the OCR data and provides an intermediate document representation for the document based on the OCR data. In some examples, the intermediate document representation includes a set of text recognized within the document and, for each text, coordinates of a bounding box, within which the text is positioned. In some examples, text includes strings (e.g., words, acronyms, numbers), where a string can include one or more characters (e.g., letters, numbers, symbols). A portion of an example intermediate document representation can include, without limitation, the following:

Listing 1: Portion of Example Intermediate Document Representation

```
[{'image_size': [2550, 3301],
  'document_page': 1,
  'line_boxes': [{'word_boxes': [
      {'bbox': [[228, 199], [303, 229]], 'content': 'Fast'},
      {'bbox': [[316, 198], [454, 236]], 'content': 'Dog'},
      {'bbox': [[468, 199], [602, 237]], 'content': 'Trading'},
      {'bbox': [[1760, 172], [2040, 285]], 'content': 'ABC'},
      'bbox': [[227, 129], [2040, 285]]},
    {'word_boxes': [
      {'bbox': [[226, 256], [284, 287]], 'content': 'PO'},
      {'bbox': [[297, 257], [361, 285]], 'content': 'Box'},
      {'bbox': [[373, 257], [425, 290]], 'content': '69'},
      {'bbox': [[437, 256], [564, 285]], 'content': 'YAMBA'},
      {'bbox': [[577, 256], [659, 285]], 'content': 'NSW'},
      {'bbox': [[672, 256], [761, 285]], 'content': '2211'}],
      'bbox': [[226, 312], [1006, 350]]},
    {'word_boxes': [
      {'bbox': [[746, 256], [835, 285]], 'content': 'Date'},
      {'bbox': [[820, 256], [894, 285]], 'content': '23/1/22'},
      ...
```

As depicted in the example of Listing 1, each text is associated with a bounding box defined by x-y coordinates. For example, and with non-limiting reference to the example of Listing 1, the text 'Fast' is associated with a bounding box having a first corner (e.g., lower left-hand corner) located at [228, 199] (e.g., $x_1=228$, $y_1=199$) and a second corner (e.g., upper right-hand corner) located at [303, 229] (e.g., $x_2=303$, $y_2=229$).

In some implementations, a set of intermediate template representations is provided. For example, the set of intermediate template representations is retrieved by the text-based detection module 204 from the template data store 210. In some examples, each intermediate template representation is associated with a template identifier that uniquely identifies the respective template in a set of templates. In some examples, each intermediate template representation includes a set of text provided within the respective template and, for each text, coordinates of a bounding box, within which the text is positioned. In some examples, text includes strings (e.g., words, acronyms, numbers), where a string can include one or more characters (e.g., letters, numbers, symbols). A portion of a first intermediate template representation can include, for example and without limitation, the following:

Listing 2: Portion of Example Intermediate
Template Representation

```
[{'image_size': [2550, 3301],
   'document_page': 1,
   'line_boxes': [{'word_boxes': [
       {'bbox': [[228, 199], [303, 229]], 'content': 'Fast'},
       {'bbox': [[316, 198], [454, 236]], 'content': 'Dog'},
       {'bbox': [[468, 199], [602, 237]], 'content': 'Trading'},
       {'bbox': [[1760, 172], [2040, 285]], 'content': 'ABC'},
       'bbox': [[227, 129], [2040, 285]]},
    {'word_boxes': [
       {'bbox': [[226, 256], [284, 287]], 'content': 'PO'},
       {'bbox': [[297, 257], [361, 285]], 'content': 'Box'},
       {'bbox': [[373, 257], [425, 290]], 'content': '69'},
       {'bbox': [[437, 256], [564, 285]], 'content': 'YAMBA'},
       {'bbox': [[577, 256], [659, 285]], 'content': 'NSW'},
       {'bbox': [[672, 256], [761, 285]], 'content': '2211'}],
       'bbox': [[226, 312], [1006, 350]]},
    {'word_boxes': [
       {'bbox': [[746, 256], [835, 285]], 'content': 'Date'},
       {'bbox': [[820, 256], [894, 285]], 'content': '15/3/19'},
  ...
```

A portion of a second intermediate template representation can include, for example and without limitation, the following:

Listing 3: Portion of Example Intermediate
Template Representation

```
[{'image_size': [2550, 3301],
   'document_page': 1,
   'line_boxes': [{'word_boxes': [
       {'bbox': [[1228, 1199], [1303, 1229]], 'content':
'Fast'},
       {'bbox': [[1316, 1198], [1454, 1236]], 'content': 'Dog'},
       {'bbox': [[1468, 1199], [1602, 1237]], 'content':
'Trading'},
       {'bbox': [[2300, 1172], [2040, 1285]], 'content': 'ABC'},
       'bbox': [[1227, 1129], [2040, 1285]]},
    {'word_boxes': [
       {'bbox': [[1226, 1256], [1284, 1287]], 'content': 'PO'},
       {'bbox': [[1297, 1257], [1361, 1285]], 'content': 'Box'},
       {'bbox': [[1373, 1257], [1425, 1290]], 'content': '69'},
       {'bbox': [[1437, 1256], [1564, 1285]], 'content':
'YAMBA'},
       {'bbox': [[1577, 1256], [1659, 1285]], 'content': 'NSW'},
       {'bbox': [[1672, 1256], [1761, 1285]], 'content':
'2211'}],
       'bbox': [[1226, 1312], [2006, 1350]]},
    {'word_boxes': [
       {'bbox': [[1746, 1256], [1835, 1285]], 'content':
'Date'},
       {'bbox': [[1820, 1256], [1894, 1285]], 'content':
'22/4/20'},
  ...
```

A portion of a third intermediate template representation can include, for example and without limitation, the following:

Listing 4: Portion of Example Intermediate
Template Representation

```
[{'image_size': [2550, 3301],
   'document_page': 1,
   'line_boxes': [{'word_boxes': [
       {'bbox': [[728, 699], [803, 729]], 'content': 'Night'},
       {'bbox': [[968, 699], [1102, 737]], 'content':
'Delivery'},
       {'bbox': [[2260, 672], [2540, 785]], 'content': 'DEF'},
       'bbox': [[227, 129], [2040, 285]]},
    {'word_boxes': [
       {'bbox': [[226, 256], [284, 287]], 'content': 'PO'},
       {'bbox': [[297, 257], [361, 285]], 'content': 'Box'},
```

-continued

Listing 4: Portion of Example Intermediate
Template Representation

```
       {'bbox': [[373, 257], [425, 290]], 'content': '256'},
       {'bbox': [[437, 256], [564, 285]], 'content': 'LONDON'},
       {'bbox': [[577, 256], [659, 285]], 'content': 'UK'},
       'bbox': [[226, 312], [1006, 350]]},
    {'word_boxes': [
       {'bbox': [[746, 256], [835, 285]], 'content': 'Time'},
       {'bbox': [[820, 256], [894, 285]], 'content':
'13:08:01'},
  ...
```

In some implementations, the text-based detection module 204 compares the intermediate document representation to each intermediate template representation based on text to define a first sub-set of templates. Each template in the first sub-set of templates is determined to be a potential match with the document 220 based on text in the document and text in respective templates.

In some implementations, the set of intermediate template representations is divided into mini-batches, each mini-batch being a sub-set of intermediate template representations. For each mini-batch, a text corpus is generated and includes text (content) present in each of the templates (i.e., the templates represented in the respective mini-batch) and text (content) present in the document 220.

In some implementations, a document vector is generated for the document 220 and a template vector is generated for each template. In some examples, each of the document vector and the template vector can be described as a text-embedding representation of an underlying document and template, respectively. In some examples, the vectors are each provided as a term frequency-inverse document frequency (TF-IDF) text embedding (also referred to as word embedding). In general, TF-IDF can be described as a numerical statistic that represents how important a text (e.g., word, number, acronym) is to a document in a document corpus. In the context of the present disclosure, the document corpus includes the document 220 and the templates of the respective mini-batch. The TF-IDF value for a respective text increases proportionally to the number of times the text appears in a document (e.g., the document 220 for the document vector, the templates of the mini-batch for the respective template vectors) and is offset by the number of documents in the document corpus that contain the text (e.g., the document 220 and the templates of the mini-batch).

In some examples, the vector is provided as an array of TF-IDF values for unique words in the text corpus. For example, a document vector for the document 220 is provided as an array of TF-IDF values for each unique text in the text corpus. In some examples, a TF-IDF value is equal to 0, if the text is not included in the document 220, and is not equal to 0, if the text is included in the document 220. Similarly, a template vector for a respective template is provided as an array of TF-IDF values for each unique text in the text corpus. In some examples, a TF-IDF value is equal to 0, if the text is not included in the template, and is not equal to 0, if the text is included in the template.

Example vectors are provided below as non-limiting illustrations of implementations of the present disclosure. For example, a text corpus of a mini-batch can include n unique texts. Consequently, each vector can be provided as an array of n dimensions, each dimension corresponding to a respective unique text in the text corpus. Accordingly, a document vector for the document 220 can be provided as:

$$D=[c_1,c_2,c_3,\ldots,c_n]$$

where c is a TF-IDF value for respective unique text (e.g., word, number, acronym). Further, template vectors for the templates included in a mini-batch can be provided as:

$$t_1 = [c_{1,1}, c_{1,2}, c_{1,3}, \ldots, c_{1,n}]$$
$$t_2 = [c_{2,1}, c_{2,2}, c_{2,3}, \ldots, c_{2,n}]$$
$$\ldots$$
$$t_i = [c_{i,1}, c_{i,2}, c_{i,3}, \ldots, c_{i,n}]$$

where i is the number of templates represented in the mini-batch.

For each document-template pair from the mini-batch, a similarity score is calculated, which represents a similarity between the document 220 and a template. In some examples, the similarity score is calculated as a cosine similarity based on the document vector and the template vector. In general, cosine similarity can be described as a measure of similarity between two non-zero vectors and is calculated as the cosine of an angle between the vectors (e.g., vectors with the same orientation have a cosine similarity of 1, vectors oriented at 90° relative to each other have a similarity of 0, and vectors diametrically opposed have a similarity of −1). Accordingly, a set of similarity scores (S) is provided as, for example:

$$S=[s_1,s_2,s_3,\ldots,s_i]$$

Here, $s_1$ is a similarity score representing a similarity between the document 220 and a first template of the mini-batch, $s_2$ is a similarity score representing a similarity between the document 220 and a second template of the mini-batch, $s_3$ is a similarity score representing a similarity between the document 220 and a third template of the mini-batch, and so on.

In some examples, each similarity score is compared to a threshold value (δ). If a similarity score meets or exceeds the threshold value, the respective template is included in a preselected set of templates ($T^*_{pre}$) (e.g., the identifier of the template is included in $T^*_{pre}$). If a similarity score does not meet or exceed the threshold value, the respective template is not included in the preselected set of templates.

Accordingly, a preselected set of templates is provided for each mini-batch. In some examples, it is determined whether any preselected set of templates is empty (i.e., no templates are included). If a preselected set of templates for a mini-batch is empty, there is no further processing for the mini-batch.

For each mini-batch (that does not have an empty preselected set of templates), the preselected set of templates is used to provide a resulting set of templates ($T^*$). More particularly, a text corpus is again generated, but includes text (content) present in each of the templates represented in the preselected set of templates ($T^*_{pre}$) and text (content) present in the document 220. In some examples, the text corpus provided based on the templates represented in the preselected set of templates ($T^*_{pre}$) is smaller than the text corpus provided based on the templates represented in the mini-batch. For example, and as noted above, the text corpus of a mini-batch can include n unique texts. The text corpus of the preselected set of templates ($T^*_{pre}$) can include m unique texts, where m<n.

In some implementations, a document vector is generated for the document 220 and a template vector is generated for each template represented in the preselected list of templates ($T^*_{pre}$). In some examples, the vectors are each generated using TF-IDF, as described herein. However, the vectors are each provided as an array of m dimensions, each dimension corresponding to a respective unique text in the text corpus. Accordingly, a document vector for the document 220 can be provided as:

$$D'=[c_1,c_2,c_3,\ldots,c_m]$$

where c is a TF-IDF value for respective unique text (e.g., word, number, acronym). Further, template vectors for the templates represented in the preselected set of templates ($T^*_{pre}$) can be provided as:

$$t'_1 = [c_{1,1}, c_{1,2}, c_{1,3}, \ldots, c_{1,m}]$$
$$t'_2 = [c_{2,1}, c_{2,2}, c_{2,3}, \ldots, c_{2,m}]$$
$$\ldots$$
$$t'_j = [c_{j,1}, c_{j,2}, c_{j,3}, \ldots, c_{j,m}]$$

where j is the number of templates represented in the preselected set of templates ($T^*_{pre}$).

For each document-template pair from the preselected set of templates ($T^*_{pre}$), a similarity score is calculated as described herein (e.g., cosine similarity). Accordingly, a set of similarity scores (S') is provided as, for example:

$$S'=[s_1,s_2,s_3,\ldots,s_j]$$

In some examples, each similarity score is compared to the threshold value (δ). If a similarity score meets or exceeds the threshold value, the respective template is included in a set of templates ($T^*$) (e.g., the identifier of the template is included in $T^*$). If a similarity score does not meet or exceed the threshold value, the respective template is not included in the set of templates ($T^*$).

Accordingly, the resulting set of templates ($T^*$) for all mini-batches are combined to provide the first sub-set of templates. That is, the templates of the resulting sets of templates are merged to provide the first sub-set of templates.

In some implementations, the text-based detection module 204 determines whether the first sub-set of templates is an empty set (i.e., no templates are represented in the first sub-set of templates). If the first sub-set of templates is an empty set, there are no templates in the template store 210 that match the document. Consequently, the extraction module 208 is instructed to execute template-less data extraction (e.g., the text-based detection module 204 instructs the extraction module 208 to execute template-less data extraction of the document 220). In some examples, template-less data extraction includes inputting the document 220 (e.g., after OCR) into a ML model, which processes the document 220 to provide output, the output including data extracted from the document 220. If the first sub-set of templates is not an empty set, the position-based detection module 206 further processes the OCR data in an effort to associate the document 220 with a template that is represented in the first sub-set of templates.

To illustrate implementations of text-based detection of the present disclosure, non-limiting reference is made to Listings 1-4 above. Execution of text-based detection would result in a first sub-set of templates that includes the template of Listing 2 and the template of Listing 3. This is because, in terms of text, the similarity between the document of Listing 1 and each of the template of Listing 2 and the template of Listing 3 is sufficient for the templates to be included in the first sub-set of templates (e.g., all include the text [Fast, Dog, Trading, PO, Box, 69, . . . ]). However, the template of Listing 4 would not be included in the first sub-set of templates. This is because, in terms of text, the similarity between the document of Listing 1 and the template of Listing 4 is insufficient for the template to be included in the first sub-set of templates (e.g., although some text is the same, such as [PO, Box], the majority of the text is different).

In some implementations, the position-based detection module 206 receives the intermediate document representation (e.g., from the text-based detection module 204) and loads (e.g., from the template store 210) an intermediate template representation for each template included in the first-sub-set of templates. In some examples, the position-based detection module 206 calculates a spatial similarity score for each document 220 and template pair. Accordingly, a set of spatial similarity scores ($S_s$) is provided as, for example:

$$S_s=[s_{s,1}, s_{s,2}, s_{s,3}, \ldots, s_{s,k}]$$

where k is the number of templates in the first sub-set of templates. In some examples, each spatial similarity score is compared to the threshold value ($\varepsilon$). If a spatial similarity score meets or exceeds the threshold value, the respective template is included in the second sub-set of templates (e.g., the identifier of the template is included in the second sub-set of templates). If a spatial similarity score does not meet or exceed the threshold value, the respective template is not included in the second sub-set of templates.

In some implementations, the spatial similarity scores are determined based on comparing locations of text in the document 220 with locations of corresponding text in respective templates. In some examples, text of the document 220 is compared to text of a template to identify matching text (e.g., the same strings). In some examples, whether text matches can be determined based on an edit distance between the text. An edit distance can be described as a number of edits (e.g., adding characters, removing characters) that would be required to make two texts identical. If the two texts are identical, the edit distance is 0. The more dislike that the texts are, the greater the edit distance between the texts. In some examples, the edit distance can be compared to a threshold edit distance to determine whether the texts match (e.g., if edit distance is 0, the texts match; if edit distance is less than threshold edit distance, the texts match).

In some examples, a text count (t_cn) is provided, the text count indicating the number of matching texts between the document 220 and a respective template. For example, and with non-limiting reference to the document of Listing 1, the template of Listing 2, and the template of Listing 3, a first text count for the document of Listing 1 and the template of Listing 2 would be 11 (i.e., 11 texts match), and a second text count for the document of Listing 1 and the template of Listing 3 would be 11 (i.e., 11 texts match).

In some implementations, for each matching text, a position of the text in the document 220 is compared to a position of the text in the template. In some examples, a position count (p_cn, initially equal to 0) is incremented for each set of matching texts, if the positions of the matching texts are within a threshold distance of each other. If the positions of the matching texts are not within the threshold distance of each other, the position count is not incremented for that set of matching texts. In some examples, the spatial similarity score for the document 220 and template pair is determined as a ratio of the position count to the text count. For example, and with non-limiting reference to the document of Listing 1, the template of Listing 2, and the template of Listing 3, a first position count for the document of Listing 1 and the template of Listing 2 would be 11 (i.e., positions of 11 texts are within the threshold distance of one another), and a second text count for the document of Listing 1 and the template of Listing 3 would be 0 (i.e., positions of none of the texts are within the threshold distance of one another). Consequently, a first spatial similarity score for the document of Listing 1 and the template of Listing 2 would be 1 (i.e., 11/11) and a second spatial similarity score for the document of Listing 1 and the template of Listing 3 would be 0 (i.e., 0/11).

In some examples, a position of a text is determined based on the bounding box data provided in the intermediate representation. In some examples, the bounding box data is processed to determine a center point of a respective bounding box, the center point being used as the position of the respective text. With non-limiting reference to the example of Listing 1, the text 'Fast' is associated with a bounding box having a first corner located at [228, 199] and a second corner located at [303, 229]. Consequently, a position of the text 'Fast' can be calculated as [265.5, 214], which is the center point of the bounding box. With non-limiting reference to the example of Listing 2, the text 'Fast' is associated with a bounding box having a first corner located at [230, 199] and a second corner located at [305, 229]. Consequently, a position of the text 'Fast' can be calculated as [267.5, 214], which is the center point of the bounding box.

In some examples, a position of the text in the document 220 is compared to a position of the content in the template by determining a distance between the positions. With non-limiting reference to the examples of Listing 1 and Listing 2, and as discussed above, the position of the content 'Fast' of Listing 1 is [265.5, 214] and the position of the content 'Fast' of Listing 2 is [267.5, 214]. Consequently, the distance between the positions is 2.

In some implementations, the position-based detection module 206 determines whether the second sub-set of templates is an empty set (i.e., no templates are represented in the second sub-set of templates). If the second sub-set of templates is an empty set, there are no templates in the template store 210 that match the document 220. Consequently, the extraction module 208 is instructed to execute template-less data extraction (e.g., the position-based detection module 206 instructs the extraction module 208 to execute template-less data extraction of the document 220). If the second sub-set of templates is not an empty set, the position-based detection module 206 determines whether the second sub-set of templates represents more than one template (e.g., whether more than one template is identified in the second sub-set of templates). If the second sub-set of templates represents a single template, the extraction module 208 is instructed to execute template-based data extraction using the template (e.g., the position-based detection module 206 instructs the extraction module 208 to execute template-based data extraction of the document 220 and indicates the template that is to be used by identifier).

If the second sub-set of templates represents more than one template (e.g., more than one template is identified in the second sub-set of templates), the position-based detection module 206 selects a template based on spatial similarity scores. For example, the template having the highest spatial similarity score with the document 220 is selected and the position-based detection module 206 instructs the extraction module 208 to execute template-based data extraction of the document 220 indicating the template that is to be used by identifier.

Figure 3:
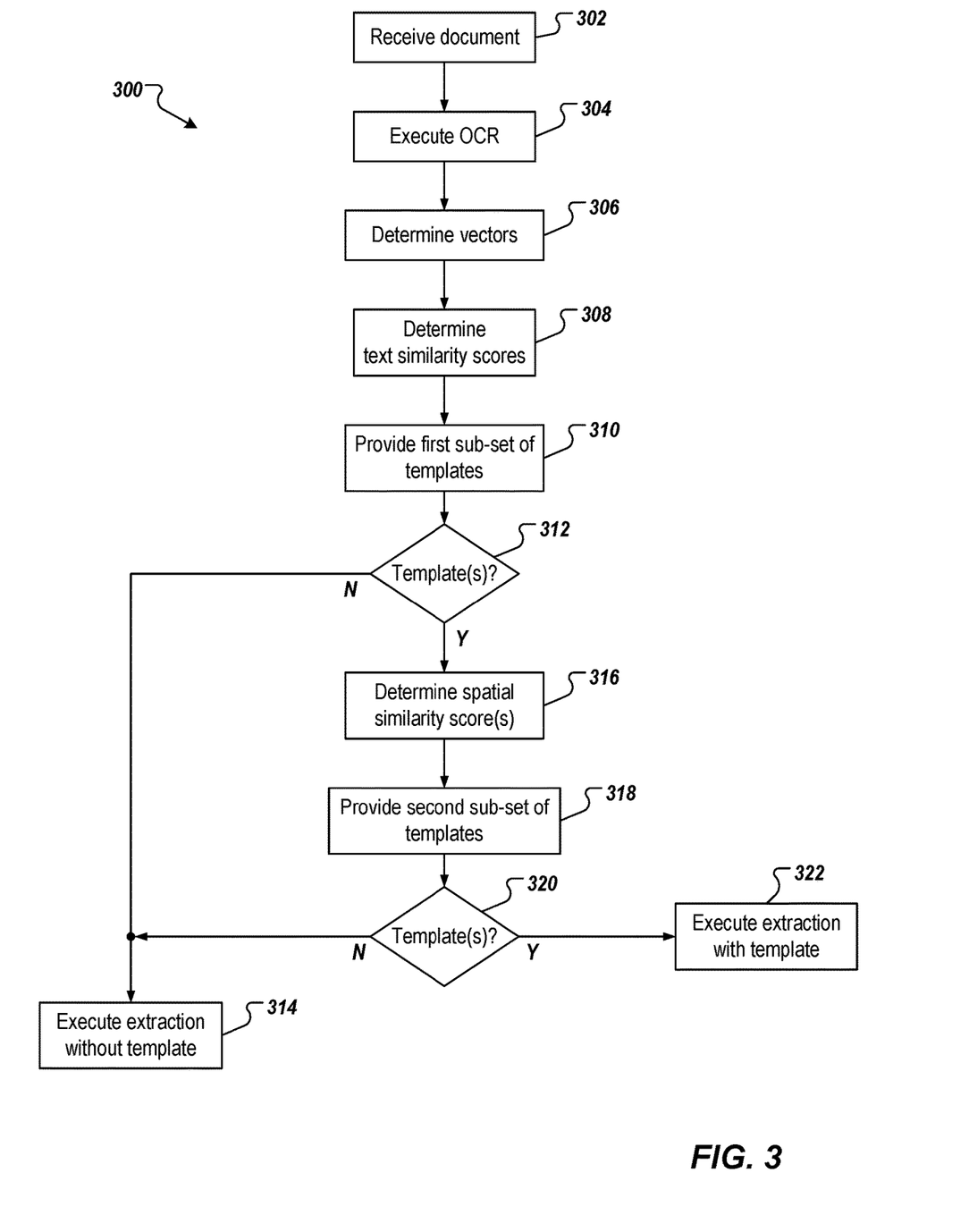
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A document is received (302). For example, and as described herein, the document 220 is received by the template detection system of FIG. 2. OCR is executed (304). For example, and as described herein, the document 220 is processed by the OCR module 202 to generate OCR data. Vectors are determined (306). For example, and as described herein, a document vector is generated for the document 220 and a template vector is generated for each template. In some examples, template vectors are generated for each template in a mini-batch of templates. That is, for example, templates can be divided into mini-batches, the mini-batches being processed in parallel to provide a first sub-set of templates. In some examples, each of the document vector and the template vector can be described as a word-embedding representation of an underlying document and template, respectively, and is provided as a TF-IDF word embedding. In some examples, a vector is provided as an array of TF-IDF values for unique words in the text corpus. For example, a document vector for the document 220 is provided as an array of TF-IDF values for each unique text in the text corpus, and a template vector for a respective template is provided as an array of TF-IDF values for each unique text in the text corpus.

Text-based similarity scores are determined (308). For example, and as described herein, for each document-template pair (from a mini-batch), a similarity score is calculated, which represents a similarity between the document 220 and a template. In some examples, the similarity score is calculated as a cosine similarity based on the document vector and the template vector. A first sub-set of templates is provided (310). For example, and as described herein, each similarity score is compared to a threshold value ($\delta$). If a similarity score meets or exceeds the threshold value, the respective template is included in a preselected list of templates ($T^*_{pre}$) (e.g., the identifier of the template is included in $T^*_{pre}$). If a similarity score does not meet or exceed the threshold value, the respective template is not included in the preselected list of templates. In some examples, for each mini-batch (that does not have an empty preselected set of templates), the preselected set of templates is used to provide a resulting set of templates ($T^*$), as described herein. The resulting set of templates ($T^*$) for all mini-batches are combined to provide the first sub-set of templates. That is, the templates of the resulting sets of templates are merged to provide the first sub-set of templates.

It is determined whether the first sub-set of templates is empty (312). For example, and as described herein, the text-based detection module 204 determines whether the first sub-set of templates is an empty set (i.e., no templates are represented in the first sub-set of templates). If the first sub-set of templates is empty, data extraction is executed without template (314). For example, and as described herein, the extraction module 208 is instructed to execute template-less data extraction (e.g., the text-based detection module 204 instructs the extraction module 208 to execute template-less data extraction of the document 220). In some examples, template-less data extraction includes inputting the document 220 (e.g., after OCR) into a ML model, which processes the document 220 to provide output, the output including data extracted from the document 220.

If the first sub-set of templates is not empty, spatial similarity scores are determined (316). For example, and as described herein, the position-based detection module 206 receives the intermediate document representation (e.g., from the text-based detection module 204) and loads (e.g., from the template store 210) an intermediate template representation for each template included in the first-sub-set of templates. In some examples, the position-based detection module 206 calculates a spatial similarity score for each document 220 and template pair, as described herein. A second sub-set of templates is provided (318). For example, and as described herein, each spatial similarity score is compared to the threshold value ($\epsilon$). If a spatial similarity score meets or exceeds the threshold value, the respective template is included in the second sub-set of templates (e.g., the identifier of the template is included in the second sub-set of templates). If a spatial similarity score does not meet or exceed the threshold value, the respective template is not included in the second sub-set of templates.

It is determined whether the second sub-set of templates is empty (320). For example, and as described herein, the position-based detection module 206 determines whether the second sub-set of templates is an empty set (i.e., no templates are represented in the second sub-set of templates). If the second sub-set of templates is empty, data extraction is executed without template (314). If the second sub-set of templates is not empty, data extraction is executed with template (322). For example, and as described herein, the extraction module 208 is instructed to execute template-based data extraction using the template (e.g., the position-based detection module 206 instructs the extraction module 208 to execute template-based data extraction of the document 220 and indicates the template that is to be used by identifier). In some examples, if the second sub-set of templates represents more than one template (e.g., more than one template is identified in the second sub-set of templates), the position-based detection module 206 selects a template based on spatial similarity scores. For example, the template having the highest spatial similarity score with the document 220 is selected and the position-based detection module 206 instructs the extraction module 208 to execute template-based data extraction of the document 220 indicating the template that is to be used by identifier.

Figure 4:
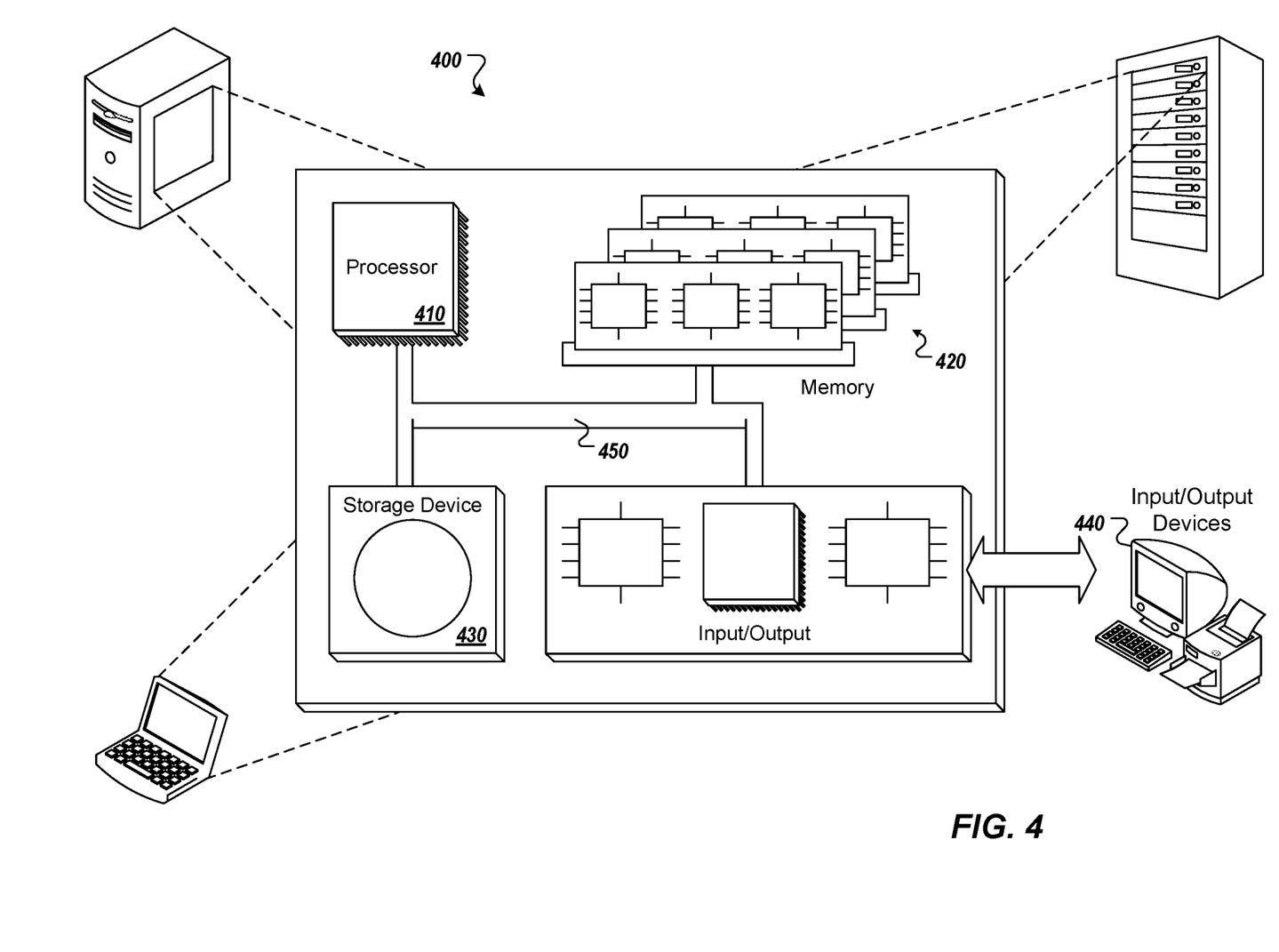
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively associating documents with templates for computer-executed data extraction, the method being executed by one or more processors and comprising:
   receiving a first intermediate document representation of a first document, the first intermediate document representation comprising optical character recognition (OCR) data representative of document text and positions of document text in the first document;
   receiving a set of intermediate template representations for a set of templates, the set of intermediate template representations comprising, for each template in the set of templates, OCR data representative of template text and positions of template text in a respective template;
   determining a first sub-set of templates using text-based detection based on the first intermediate document representation and the set of intermediate template representations at least by:
      providing a document vector representative of the first document based on the document text in the first document,
      providing template vectors for each template in the set of templates based on template text in respective templates,
      generating a set of similarity scores by comparing the document vector to respective template vectors, and
      selectively including one or more templates of the set of templates in the first sub-set of templates based on respective similarity scores of the set of similarity scores;
   determining a second sub-set of templates using position-based detection based on the first intermediate document representations and intermediate template representations associated with one or more templates in the first sub-set of templates; and transmitting instructions to execute template-based data extraction for the first document using a template of the second sub-set of templates.

2. The method of claim 1, wherein the document vector and the template vectors are each provided as term frequency-inverse document frequency (TF-IDF) text embeddings.

3. The method of claim 1, wherein determining a second sub-set of templates using position-based detection at least partially comprises:

for each first document and template pair of templates in the first sub-set of templates:
determining a set of matching text between text of the first document and text of a respective template, and
generating a spatial similarity score by comparing positions of matching text of the set of matching text; and selectively including one or more templates of the first sub-set of templates in the second sub-set of templates based on respective spatial similarity scores.

4. The method of claim 1, further comprising:

receiving a second intermediate document representation of a second document, the second intermediate document representation comprising OCR data representative of document text and positions of document text in the second document;

receiving the set of intermediate template representations for the set of templates;

determining a third sub-set of templates using text-based detection based on the second intermediate document representation and the set of intermediate template representations; and determining that the third sub-set of templates is empty and, in response, transmitting instructions to execute template-less data extraction for the second document using a template of the third sub-set of templates.

5. The method of claim 1, further comprising:

receiving a second intermediate document representation of a second document, the second intermediate document representation comprising OCR data representative of document text and positions of document text in the second document;

receiving the set of intermediate template representations for the set of templates;

determining a third sub-set of templates using text-based detection based on the second intermediate document representation and the set of intermediate template representations;

determining a fourth sub-set of templates using position-based detection based on the second intermediate document representations and intermediate template representations associated with one or more templates in the third sub-set of templates; and determining that the fourth sub-set of templates is empty and, in response, transmitting instructions to execute template-less data extraction for the second document.

6. The method of claim 1, wherein determining a second sub-set of templates is executed in response to determining that the first sub-set of templates comprises at least one template.

7. A non-transitory computer-readable storage medium coupled to one or more processors and having instructions stored thereon which, when executed by the one or more processors, cause the one or more processors to perform operations for selectively associating documents with templates for computer-executed data extraction, the operations comprising:

receiving a first intermediate document representation of a first document, the first intermediate document representation comprising optical character recognition (OCR) data representative of document text and positions of document text in the first document;

receiving a set of intermediate template representations for a set of templates, the set of intermediate template representations comprising, for each template in the set of templates, OCR data representative of template text and positions of template text in a respective template;

determining a first sub-set of templates using text-based detection based on the first intermediate document representation and the set of intermediate template representations at least by:
providing a document vector representative of the first document based on the document text in the first document,
providing template vectors for each template in the set of templates based on template text in respective templates,
generating a set of similarity scores by comparing the document vector to respective template vectors, and
selectively including one or more templates of the set of templates in the first sub-set of templates based on respective similarity scores of the set of similarity scores;

determining a second sub-set of templates using position-based detection based on the first intermediate document representations and intermediate template representations associated with one or more templates in the first sub-set of templates; and transmitting instructions to execute template-based data extraction for the first document using a template of the second sub-set of templates.

8. The non-transitory computer-readable storage medium of claim 7, wherein the document vector and the template vectors are each provided as term frequency-inverse document frequency (TF-IDF) text embeddings.

9. The non-transitory computer-readable storage medium of claim 7, wherein determining a second sub-set of templates using position-based detection at least comprises:

for each first document and template pair of templates in the first sub-set of templates:
determining a set of matching text between text of the first document and text of a respective template, and
generating a spatial similarity score by comparing positions of matching text of the set of matching text; and selectively including one or more templates of the first sub-set of templates in the second sub-set of templates based on respective spatial similarity scores.

10. The non-transitory computer-readable storage medium of claim 7, wherein operations further comprise:

receiving a second intermediate document representation of a second document, the second intermediate document representation comprising OCR data representative of document text and positions of document text in the second document;

receiving the set of intermediate template representations for the set of templates;

determining a third sub-set of templates using text-based detection based on the second intermediate document representation and the set of intermediate template representations; and determining that the third sub-set of templates is empty and, in response, transmitting instructions to execute template-less data extraction for the second document using a template of the third sub-set of templates.

11. The non-transitory computer-readable storage medium of claim 7, wherein operations further comprise:
receiving a second intermediate document representation of a second document, the second intermediate document representation comprising OCR data representative of document text and positions of document text in the second document;
receiving the set of intermediate template representations for the set of templates;
determining a third sub-set of templates using text-based detection based on the second intermediate document representation and the set of intermediate template representations;
determining a fourth sub-set of templates using position-based detection based on the second intermediate document representations and intermediate template representations associated with one or more templates in the third sub-set of templates; and
determining that the fourth sub-set of templates is empty and, in response, transmitting instructions to execute template-less data extraction for the second document.

12. The non-transitory computer-readable storage medium of claim 7, wherein determining a second sub-set of templates is executed in response to determining that the first sub-set of templates comprises at least one template.

13. A system, comprising:
a computing device; and
a computer-readable storage device coupled to the computing device and having instructions stored thereon which, when executed by the computing device, cause the computing device to perform operations for selectively associating documents with templates for computer-executed data extraction, the operations comprising:
receiving a first intermediate document representation of a first document, the first intermediate document representation comprising optical character recognition (OCR) data representative of document text and positions of document text in the first document;
receiving a set of intermediate template representations for a set of templates, the set of intermediate template representations comprising, for each template in the set of templates, OCR data representative of template text and positions of template text in a respective template;
determining a first sub-set of templates using text-based detection based on the first intermediate document representation and the set of intermediate template representations at least by:
providing a document vector representative of the first document based on the document text in the first document,
providing template vectors for each template in the set of templates based on template text in respective templates,
generating a set of similarity scores by comparing the document vector to respective template vectors, and
selectively including one or more templates of the set of templates in the first sub-set of templates based on respective similarity scores of the set of similarity scores;
determining a second sub-set of templates using position-based detection based on the first intermediate document representations and intermediate template representations associated with one or more templates in the first sub-set of templates; and
transmitting instructions to execute template-based data extraction for the first document using a template of the second sub-set of templates.

14. The system of claim 13, wherein the document vector and the template vectors are each provided as term frequency-inverse document frequency (TF-IDF) text embeddings.

15. The system of claim 13, wherein determining a second sub-set of templates using position-based detection at least partially comprises:
for each first document and template pair of templates in the first sub-set of templates:
determining a set of matching text between text of the first document and text of a respective template, and
generating a spatial similarity score by comparing positions of matching text of the set of matching text; and
selectively including one or more templates of the first sub-set of templates in the second sub-set of templates based on respective spatial similarity scores.

16. The system of claim 13, wherein operations further comprise:
receiving a second intermediate document representation of a second document, the second intermediate document representation comprising OCR data representative of document text and positions of document text in the second document;
receiving the set of intermediate template representations for the set of templates;
determining a third sub-set of templates using text-based detection based on the second intermediate document representation and the set of intermediate template representations; and
determining that the third sub-set of templates is empty and, in response, transmitting instructions to execute template-less data extraction for the second document using a template of the third sub-set of templates.

17. The system of claim 13, wherein operations further comprise:
receiving a second intermediate document representation of a second document, the second intermediate document representation comprising OCR data representative of document text and positions of document text in the second document;
receiving the set of intermediate template representations for the set of templates;
determining a third sub-set of templates using text-based detection based on the second intermediate document representation and the set of intermediate template representations;
determining a fourth sub-set of templates using position-based detection based on the second intermediate document representations and intermediate template representations associated with one or more templates in the third sub-set of templates; and
determining that the fourth sub-set of templates is empty and, in response, transmitting instructions to execute template-less data extraction for the second document.

* * * * *